Figure 1:
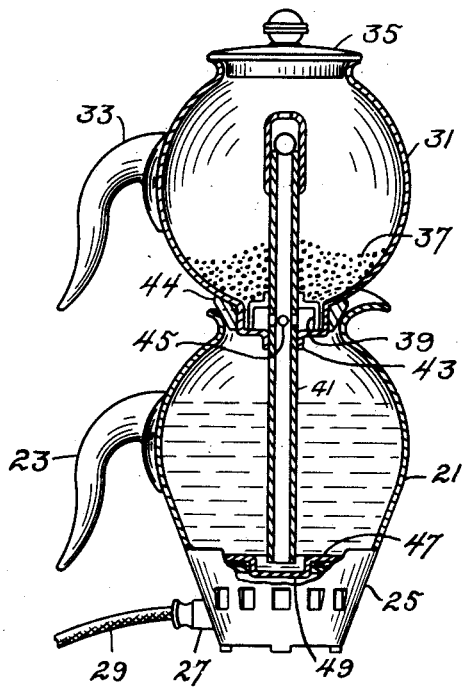

Nov. 11, 1941.  M. IRELAND  2,262,286

COFFEE MAKER THERMOSTATIC CONTROL MEANS

Filed June 6, 1940　　2 Sheets-Sheet 1

INVENTOR
MURRAY IRELAND
BY
ATTORNEY

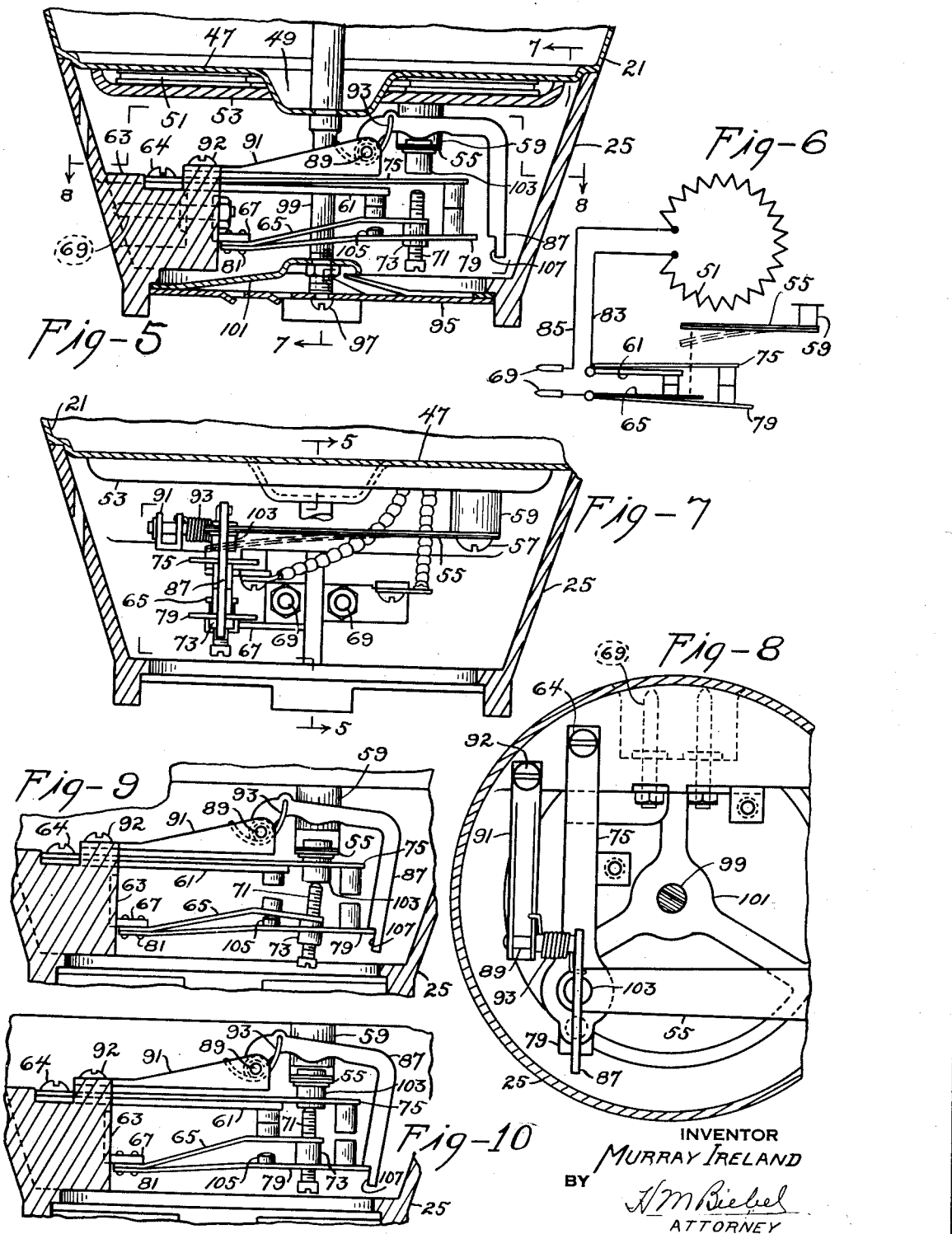

Patented Nov. 11, 1941

2,262,286

UNITED STATES PATENT OFFICE 2,262,286

COFFEE MAKER THERMOSTATIC CONTROL MEANS

Murray Ireland, near Elgin, Ill., assignor to McGraw Electric Company, Elgin, Ill., a corporation of Illinois Application June 6, 1940, Serial No. 339,047

5 Claims. (Cl. 200—138)

My invention relates to electric vacuum type coffee makers and particularly to temperature control and timing means therefor.

An object of my invention is to provide a relatively simple thermally actuable switch for controlling the operation of making coffee in a vacuum type coffee maker.

Another object of my invention is to provide a thermally controlled switch for use on a coffee maker, that shall cause initial heating of the water to near the boiling point and that shall thereafter maintain the coffee brew at a predetermined lower temperature.

Another object of my invention is to provide a thermostatic switch that shall be operable at a relatively high temperature and then at a lower temperature and that shall cause all parts to return to their initial normal positions after each use thereof.

Other objects of my invention will either be apparent from a description of one form of device embodying my invention or will be pointed out in the course of such description and more definitely set forth in the appended claims.

Figure 2:
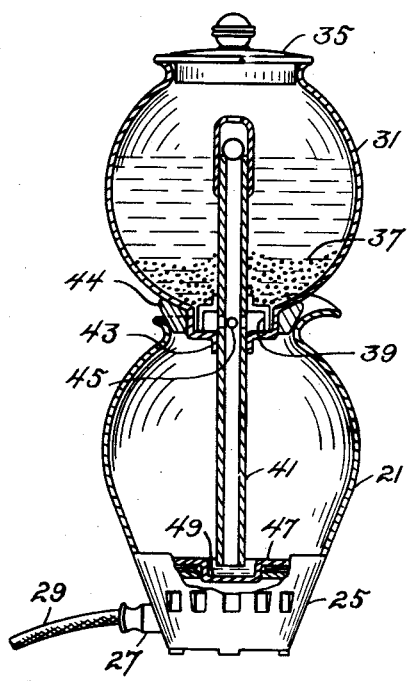
Figure 3:
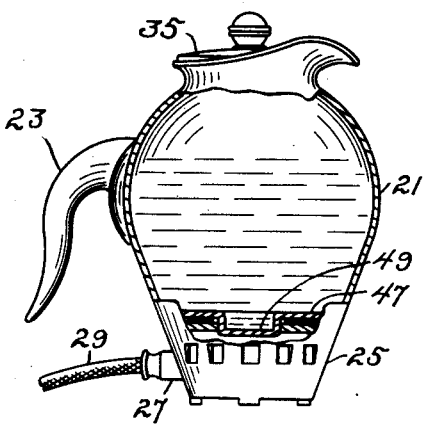

In the drawings:

Figure 1 is a vertical sectional view of a vacuum type coffee maker shown as being ready for starting a brewing operation, Fig. 2 is a vertical sectional view similar to Fig. 1 but showing the conditions when the water has been forced from the lower container into the upper steeping container, Fig. 3 is a vertical sectional view through the lower container shown as ready for serving coffee therefrom.

Figure 4:
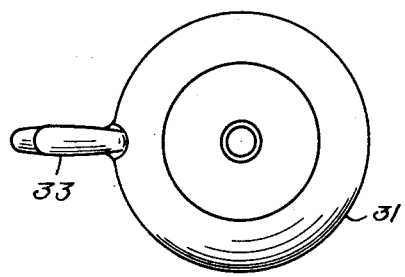

Fig. 4 is a top plan view of the parts shown in Fig. 1,

Fig. 5 is a vertical sectional view through the base or lower part of the coffee maker with the parts of the thermostatic control means shown in the positions they will occupy when starting a coffee making operation, Fig. 6 is a diagram of the electrical circuits of my improved coffee maker, Fig. 7 is a vertical sectional view taken on the line 7—7 of Fig. 5, Fig. 8 is a horizontal sectional view taken on the line 8—8 of Fig. 5, Fig. 9 is a fragmentary vertical sectional view similar to Fig. 5 but showing the parts in other operating positions, and, Fig. 10 is a view similar to Fig. 9 except the thermostatic parts are shown in the positions they will occupy when maintaining the coffee brew ready for serving.

I have elected to show my improved thermostatic control means as applied to a vacuum type coffee maker including a lower container 21 having a lifting and carrying handle 23 secured thereto and I preferably make the container 21 of metal. I do not, however, desire to be limited thereto as other materials may be used by me. The lower container includes a hollow base 25 secured therebelow and provision is made for the insertion of a connection plug 27 connected to one end of a twin conductor cord 29 to permit of energizing an electric heater to be referred to hereinafter.

I provide further an upper container 31 having secured thereto a handle 33 and this container is provided with a cover 35, the opening in the top of upper container 31 being substantially the same as the opening in the top of lower container 21 to permit of using the cover 35 with either of the two containers. The upper container 31 is adapted to receive a charge of ground coffee 37 and a filter structure 39 of any suitable or desired kind may be employed. This filter may be removably mounted on and associated with a riser tube 41 which tube extends through a bottom opening 43 in upper container 31, of reduced size, so that when the water in the lower container is heated to or near the boiling point, the pressure therein will cause the water to be forced upwardly in a manner now well known in the art, through the tube 41 and this heated water is to be held in the upper container to steep the grounds 37 for a predetermined length of time. A gasket 44 is positioned between the two interfitting containers. The brew can return to the lower container 21 when the same has been cooled sufficiently to reduce the initial pressure to a partial vacuum, through one or more openings 45 in riser tube 41, small openings 45 being located just above portion 43 of the upper container 31. I may point out here that the bottom wall 47 of the lower container is provided with a central depressed portion 49 as shown in the several figures of the drawings so that the amount of water remaining in the lower container 21 will be relatively small and that substantially all of the water is forced upwardly into the upper brewing or steeping chamber in container 31 and the temperature changes under certain operating conditions will be relatively quick and large whereby effective operation of the thermal controlling means to be hereinafter described may be obtained.

Referring now to Figs. 5 to 10 of the drawings, it will be noted that a flat electric heating element 51, which may be of annular shape, is held clamped against the lower surface of the bottom wall 47 by a clamping plate 53 which may be secured in its proper operative position by any means not particularly shown in the drawings.

A bimetal bar 55 has one of its ends secured as by means of a short machine screw 57, against the lower end of a short metallic lug 59 which may be held against the bottom surface of lower wall 47 of container 21 in any suitable or desired manner so that the lug or stud 59 will be in good heat-receiving relation with said lower wall.

I provide further a pair of switches, the first one consisting of a relatively rigid contact bar 61 which is mounted on a member 63 which may be of electric-insulating material and which may be a part of the hollow base portion 25 hereinbefore mentioned and which is held by a short machine screw 64. The first switch includes further a resilient contact arm or bar 65 positioned below the rigid bar 61 and this bar 65 may be supported by a bracket 67 which may be held against a vertical surface of member 63 by one of two terminal pins 69, of which two are provided, in a manner well known in the art. The outer end of the lower contact arm 65 extends beyond the outer end of contact arm 61 and has mounted thereon an adjustable screw 71 which may extend through a bushing 73 suitably brazed or welded to the outer end of arm 65. Arm 65 is biased upwardly so that normally contact members on the two arms 61 and 65 will be in engagement.

I provide further a second switch consisting of an upper resilient contact bar 75 which is positioned immediately above the rigid contact bar 61 and which may be held on member 63 by the machine screw 64 which serves to hold bar 61 in its proper operative position. This arm 75 is longer than arm 65. The second switch has further a lower resilient contact arm 79 which has an opening therein through which the lug 73 may extend to permit of movement of arm 65 and of screw 71 and lug 73 relatively to contact bar 79. Arms 75 and 79 are provided with contact members in a manner well known in the art, which contact members are normally in engagement with each other as shown particularly in Fig. 5 of the drawings. The other end of arm 79 is secured to bracket 67 and small machine screws or rivets 81 may hold bars 79 and 65 on this bracket in electrical conducting relation therewith. Contact bar 79 is so constructed and supported that it normally is in contacting engagement with contact bar 75 and that it bends the latter away from the rigid contact bar 61, as shown in Fig. 5 of the drawings.

As shown in Fig. 6 of the drawings, one of the terminal pins 69 is directly connected to the arms 65 and 79 while a conductor 83 connects the two arms 61 and 75 to one terminal of the electric heating element 51, the other terminal of which is connected by a second conductor 85 to the other terminal pin 69, all in a manner well known in the art.

A latch member 87, of substantially L-shape, has one end thereof pivotally mounted as by a pin 89 on a supporting bar 91 of channel shape in lateral section, which bar may be supported from a part of support 63 as by a machine screw 92. A biasing spring 93 tends to hold the latch member 87 turned in a clockwise direction but normally, i. e., when the coffee maker is not in use and is cold, the bimetal bar 55 will hold the latch 87 in substantially the position shown in Fig. 5 of the drawings where the movable end is out of engagement with the end of contact bar 79.

Base 25 may be provided with a bottom closure plate 95 which may be held in its proper operative position by a short machine screw 97 fitting into the lower screw-threaded end of a depending rod 99 which is effective also to hold a skeleton frame 101 against a lower peripheral edge of base member 25.

Let it be assumed that it is desired to make coffee in a coffee maker of the kind shown in the drawings, which coffee maker is equipped with the thermally actuable control means above described. It is assumed that the desired amount of water has been placed in the lower container and the proper amount of ground coffee has been placed in the upper container and the coffee maker is now energized as by connecting the twin conductor cord 29 to a suitable source of supply of electric energy. The electric heater 51 will cause heating of the water in the lower container 21 and the vapors or steam generated thereby will cause a pressure in container 21 which will force substantially all of the water therein upwardly through tube 41 into the upper container 31. I may provide means, such as additional openings in tube 41 below the lower end of portion 43, to prevent upward movement of the water from container 21 until it has been heated to a relatively high temperature. It is usually desired to continue the energization of the electric heating elements of the coffee maker for a length of time sufficient to cause proper steeping or leaching of the ground coffee, after which the electric heating element should be deenergized to thereby cause a vacuum to be formed in the cooling lower container 21 which will ultimately cause downward flow of the essence or brew from the upper container back into the lower container from which it may then be served and poured after the upper container and the riser tube have been removed, all in a manner well known in the art.

Referring first to Fig. 5 of the drawings, the parts of the thermally controlled switch means are shown in their initial substantially cold position and it may be pointed out that flexing movement of heated bimetal bar 55 in a downward direction will cause engagement of a lug 103, of electric-insulating material, secured to the outer end thereof with the upper end of the adjustable screw 71 mounted on lower arm 65 of the first switch. At a predetermined temperature which will hereinafter be further referred to, engagement of lug 103 on bimetal bar 55 with the end of screw 71 will result in downward movement of arm 65 to thereby disengage the contact member thereon with the contact member on the rigid arm 61. The circuit through the first switch is therefore interrupted but this will have no effect upon the energization of the electric heater since current thereto will still flow through contact arms 75 and 79 and the contact members carried thereby.

Continued energization of the heater 51 will cause further downward warping movement of bimetal bar 55 and further bending of lower contact bar 65 until finally an intermediate part of contact bar 65 will engage a lug 105 mounted on the upper surface of contact arm 79 intermediate its ends so that ultimately the circuit will be broken through the second switch comprising contact bars 75 and 79, as shown, for instance, in Fig. 9 of the drawings. I desire here to point out that it is possible to predetermine and adjust, either in the factory or later if desired, the difference in time and temperature required to cause interruption of the first switch and then interruption of the second switch.

When the circuit has been interrupted through the heating element 51 as by final disengagement of contact bars 75 and 79, contact bar 79 will have been turned in a clockwise direction by reason of its having been engaged by the lower contact bar 65 of the first switch, so that latch 87, which has a shouldered portion 107 at its lower end, is moved into the position shown in Fig. 9 of the drawings where it will be effective to hold contact bar 79 in its circuit-interrupting position. It may here be pointed out that during the early part of the movement of bimetal bar 55 the upper end of lug 103, which normally and initially is in engagement with an intermediate part of latch 89, was moved out of engagement therewith whereby the initial bias of this latch was removed so that spring 93 could cause turning movement thereof in a clockwise direction against the outer end of contact bar 79. As has just been stated, when bar 79 has been turned far enough in a clockwise direction by the action of the bimetal bar 55, latch 87 will engage with bar 79 to hold it in its opened position.

The heating element now being completely deenergized, it and the parts heated thereby will be subject to a fall of temperature and since the temperature at which latch 87 engaged contact bar 79 is either the boiling point of water or very close thereto, the cooling lower container 21 will shortly have a vacuum created therein, in a manner well known in vacuum type coffee makers, with the final result that the brew is drawn downwardly into the lower container.

It is desired to now maintain this brew in the lower container at a predetermined serving temperature until it is to be used, and the cooling bimetal bar 55 will now warp in a direction opposite to that in which it warped on being heated and this will result in counter-clockwise turning movement of contact bar 65 of the first switch until finally the two contact bars 61 and 65 will again engage with the result that the heating element for the coffee maker is again energized and the bimetal bar will then be subjected to reheating. As soon as the bimetal bar has again been flexed downwardly a sufficient amount by this reheating the circuit through the heating element will thereby be broken through the first switch and sequential and consecutive energization and deenergization of the heating element coincident with the closing and opening of the first switch will continue for as long as the coffee maker is connected through its twin conductor cord to a supply circuit.

Let it now be assumed that the connection of the electric heater to a supply circuit is interrupted as by removing the plug from the supply circuit socket or by removing the plug 27 from the coffee maker to permit of carrying the lower container and the cover 35 thereon, to a place of use, such as a breakfast or dinner table. It is evident that under these conditions the bimetal bar 55 will finally cool to room temperature and in this case the upper end of lug 103 on the outer end of bimetal bar 55 will again engage latch member 87 and cause releasing turning movement thereof in a counter-clockwise direction and to substantially the position shown in Fig. 5 of the drawings and this turning movement may be limited by any suitable stop means. It is thus evident that the thermally controlled plural switch structure is returned to its initial, ready-to-operate condition in due course after the termination of its use in making and serving coffee.

I wish to here point out that while the higher predetermined temperature is substantially that of boiling or slightly therebelow, the temperature maintained in the brewed coffee by the first switch may be any desired value, say on the order of 150° to 170° as may be desired by the user or as may be desired in accordance with the conditions of use.

It may be noted that the structure embodying my invention is relatively simple, embodies a relatively few parts only, and that it is possible to vary the time between the attainment of the maximum temperature and the attainment of that temperature provided by the first switch whereby to easily and quickly vary the time of brewing, in accordance with the desire of the user. Temperature of bimetal bar 55 at which lug 103 thereof will engage screw 71 may be varied by adjustment of screw 71 and variation in the height of lug 105 on contact bar 79 will vary the length of time between disengagement of contact bars 65 and 61 and the disengagement of contact bars 79 and 75 and hence the difference between the temperatures at which such disengagements occur.

While I have illustrated a specific embodiment, I do not desire to be limited thereto and all changes and modifications clearly coming within the scope of the appended claims are to be considered as being covered thereby.

I claim as my invention:

1. A thermal switch for controlling the electric heater of a coffee maker to provide a high temperature and then a lower temperature, said switch comprising a bimetal bar, a pair of outer resilient contact bars normally closing a circuit through the heater, a rigid contact bar electrically connected to one of said outer contact bars and a third resilient contact bar electrically connected to the other of said outer contact bars, said rigid and said third contact bar cooperating to normally close a parallel circuit through the heater, means for causing the heated bimetal bar to first operatively engage the third resilient contact bar and move it out of circuit-closing engagement with the rigid contact bar and then to further move the third resilient contact bar to cause it to effect movement of said other outer contact bar out of circuit-closing engagement with said one outer contact bar and means to hold said other outer contact bar in actuated position, the bimetal bar then cooling and causing engagement and disengagement of the rigid and the third contact bar to maintain the bimetal bar at a substantially uniform average temperature.

2. A thermal switch for controlling the energization of the electric heater of a coffee maker to provide first a high and then a lower temperature in the coffee maker, said switch comprising a bimetal bar subject to heat from the coffee maker, a pair of outer resilient contact bars normally in engagement to close a circuit through said heater, an intermediate substantially rigid contact bar electrically connected with one of said outer contact bars, an intermediate third resilient contact bar electrically connected with the other of said outer contact bars and normally in engagement with the substantially rigid bar to close a parallel circuit through said heater, means for causing the heated bimetal bar to first operatively engage the third resilient contact bar and move it out of circuit-closing relation with said substantially rigid contact bar and then to further move the third resilient contact bar and cause it to move the other outer resilient contact bar out of circuit-closing relation with said one outer contact bar and detent means to hold the other outer resilient contact bar in its actuated position to thereby deenergize said heater and cause cooling of the bimetal bar and sequential engagement and disengagement of the third resilient contact bar and the substantially rigid contact bar to energize and deenergize the heater and maintain the coffee maker at a substantially uniform average temperature and permanent deenergization of the heater circuit causing further cooling of the bimetal bar and engagement thereof with the detent means to cause the latter to be disengaged from said other outer resilient contact bar.

3. A thermal switch for controlling the current flow through the electric heater of a coffee maker to provide first a high temperature and then a lower temperature in the coffee maker, said switch comprising a bimetal bar subject to heat from the coffee maker, a first outer resilient contact bar, a substantially rigid contact bar, a support common to both said bars, a second outer resilient contact bar, a third resilient contact bar, a second support common to said second and said third contact bar, said supports positioning said rigid contact bar and said third contact bar between said first and second outer contact bars, said outer contact bars being normally inherently biased into contact with each other to close a circuit through the heater and said third resilient contact bar being normally inherently biased into contact with said substantially rigid contact bar to close a parallel circuit through the heater, said bimetal bar being effective on energization of the heater circuit to operatively engage said third resilient contact bar and move it out of engagement with said substantially rigid contact bar and then to further move said third resilient contact bar into operative engagement with said second outer resilient contact bar and cause it to move out of engagement with said first outer resilient contact bar to deenergize said heater and a detent means engageable by said second outer resilient contact bar to hold the latter in open circuit position, the bimetal bar then cooling and causing engagement and disengagement of said third resilient contact bar and said rigid contact bar to maintain a substantially uniform average temperature in the coffee maker, permanent deenergization of the heater circuit causing further cooling of the bimetal bar and engagement thereof with the detent means to cause the latter to be disengaged from said second outer resilient contact bar and return of the parts of the switch to initial positions.

4. A thermal switch for controlling the current flow through the electric heater of a coffee maker including a main switch to provide first a high temperature and then a lower temperature in the coffee maker, said switch comprising two parallel-connected pairs of contact bars normally providing two parallel closed circuits for the heater, a bimetal bar subject to heat from the coffee maker and effective on closure of said main switch to move and engage one contact bar of the first pair and move it to switch-opening position and to then further move said one contact bar into engagement with a contact bar of the second pair and cause its movement into switch-opening position, and a detent means engageable by said contact bar of the second pair to hold the latter in open position, opening of the main switch causing cooling of the bimetal bar and engagement thereof with said detent means to cause release thereof from said contact bar of the second pair and return of all switch parts to normal initial positions.

5. Means for controlling the energization of an electric heater to provide first a predetermined high and then a predetermined lower temperature, said control means comprising two pairs of contact arms providing two parallel-connected switches controlling the circuit of the heater, a bimetal bar subject to heat from said heater and effective on rise of temperature to engage one of said contact arms and thereby effect opening of said switches in sequence and detent means for holding the last opened switch in open position, said detent means being operatively engageable by said bimetal bar when it has cooled to a predetermined low temperature to cause release of the last opened switch and return to closed position.

MURRAY IRELAND.